US008264589B2

(12) United States Patent
Fukushima (10) Patent No.: US 8,264,589 B2
(45) Date of Patent: Sep. 11, 2012

(54) DISPLAY CONTROL APPARATUS, METHOD OF CONTROLLING DISPLAY APPARATUS, AND STORAGE MEDIUM

(75) Inventor: Hiroyuki Fukushima, Mitaka (JP)

(73) Assignee: Canon Kabushiki Kaisha, Tokyo (JP)

( * ) Notice: Subject to any disclaimer, the term of this patent is extended or adjusted under 35 U.S.C. 154(b) by 278 days.

(21) Appl. No.: 12/771,347

(22) Filed: Apr. 30, 2010

(65) Prior Publication Data
US 2010/0309361 A1 Dec. 9, 2010

(30) Foreign Application Priority Data

Jun. 3, 2009 (JP) ................................. 2009-134300

(51) Int. Cl.
*H04N 5/222* (2006.01)
(52) U.S. Cl. ............................. 348/333.12; 348/333.01
(58) Field of Classification Search . 348/333.01–333.12
See application file for complete search history.

(56) References Cited

U.S. PATENT DOCUMENTS

| 2002/0118292 | A1* | 8/2002 | Baron ............................ 348/335 |
| 2005/0041156 | A1 | 2/2005 | Kondo et al. |

FOREIGN PATENT DOCUMENTS

| JP | 2000-156814 | 6/2000 |
| JP | 2003-323170 | 11/2003 |

* cited by examiner

*Primary Examiner* — Sinh Tran
*Assistant Examiner* — Christopher K Peterson
(74) *Attorney, Agent, or Firm* — Cowan, Liebowitz & Latman, P.C.

(57) ABSTRACT

A display control apparatus comprises a display unit configured to display a captured image; an acquisition unit configured to acquire image captured direction information indicating a direction in which the image was captured; a conversion unit configured to convert a shape of the image in accordance with the image captured direction information; and a control unit configured to control to display the shape-converted image on the display unit.

26 Claims, 8 Drawing Sheets

DISPLAY CONTROL APPARATUS, METHOD OF CONTROLLING DISPLAY APPARATUS, AND STORAGE MEDIUM

BACKGROUND OF THE INVENTION

1. Field of the Invention

The present invention relates to a display control technique of displaying a captured image.

2. Description of the Related Art

A captured image is generally displayed within a fixed frame, like the screen of a display apparatus. For example, when displaying a moving image captured by a video camera on the screen of a television apparatus, it is generally displayed in the entire frame of the display screen. For example, when displaying a moving image on the monitor of a personal computer (PC), it is displayed in the entire frame of the screen. In addition, a fixed display frame called a window is set, and the moving image is also displayed in the frame.

Regarding the display control technique, Japanese Patent Laid-Open No. 2003-323170 discloses a technique to enhance the sense of reality. In this technique, the image signal of a captured image, and motion information that corresponds to a motion in the image captured direction, are generated. The image is displayed to move based on the motion information in a display area wider in viewing angle than the captured image. In a technique disclosed in Japanese Patent Laid-Open No. 2000-156814, information on the tilt of a camera with respect to an object and an adjusted zoom value is acquired in capturing. The image is displayed by rotating it in accordance with the tilt of the camera, or enlarging or reducing it based on the zoom value.

According to conventional techniques, a user who views a displayed captured image has to estimate, from an object in the displayed captured image, the direction in which the image was captured, or the motion of the photographer when he captured the image. It is difficult for a user to intuitively grasp the direction or motion. In Japanese Patent Laid-Open No. 2003-323170, a captured image is displayed to move on the screen along with the motion in the image captured direction. However, the image is displayed in a frame having the same shape as that in capturing. As long as the user keeps viewing the image within the frame, it is still difficult to intuitively grasp the direction in which the image was captured, or the motion of the photographer when he captured the image. The user has to estimate the direction or motion from an object in the displayed captured image.

SUMMARY OF THE INVENTION

The present invention has been conceived in view of the above problems, and the present invention realizes a technique capable of displaying a captured image to facilitate intuitive grasp of the direction in which the displayed image was captured, or the motion of the photographer when he captured the image.

In order to solve the aforementioned problems, the present invention provides a display control apparatus comprising: a display unit configured to display a captured image; an acquisition unit configured to acquire image captured direction information indicating a direction in which the image was captured; a conversion unit configured to convert a shape of the image in accordance with the image captured direction information; and a control unit configured to control to display the shape-converted image on the display unit.

The present invention also provides a method of controlling a display apparatus that displays a captured image, the method comprising the steps of: acquiring image captured direction information indicating a direction in which the image was captured; converting a shape of the image in accordance with the image captured direction information; and controlling to display the shape-converted image on the display apparatus.

According to the present invention, a captured image can be displayed to facilitate intuitive grasp of the direction that the displayed image was captured, or the motion of the photographer when he captured the image.

Further features of the present invention will become apparent from the following description of exemplary embodiments (with reference to the attached drawings).

DESCRIPTION OF THE EMBODIMENTS

Embodiments of the present invention will be described in detail below with reference to the accompanying drawings.

The following embodiments are merely examples for practicing the present invention. The embodiments should be properly modified or changed depending on various conditions and the structure of an apparatus to which the present invention is applied. The present invention should not be limited to the following embodiments.

[Apparatus Arrangement]

Figure 1:
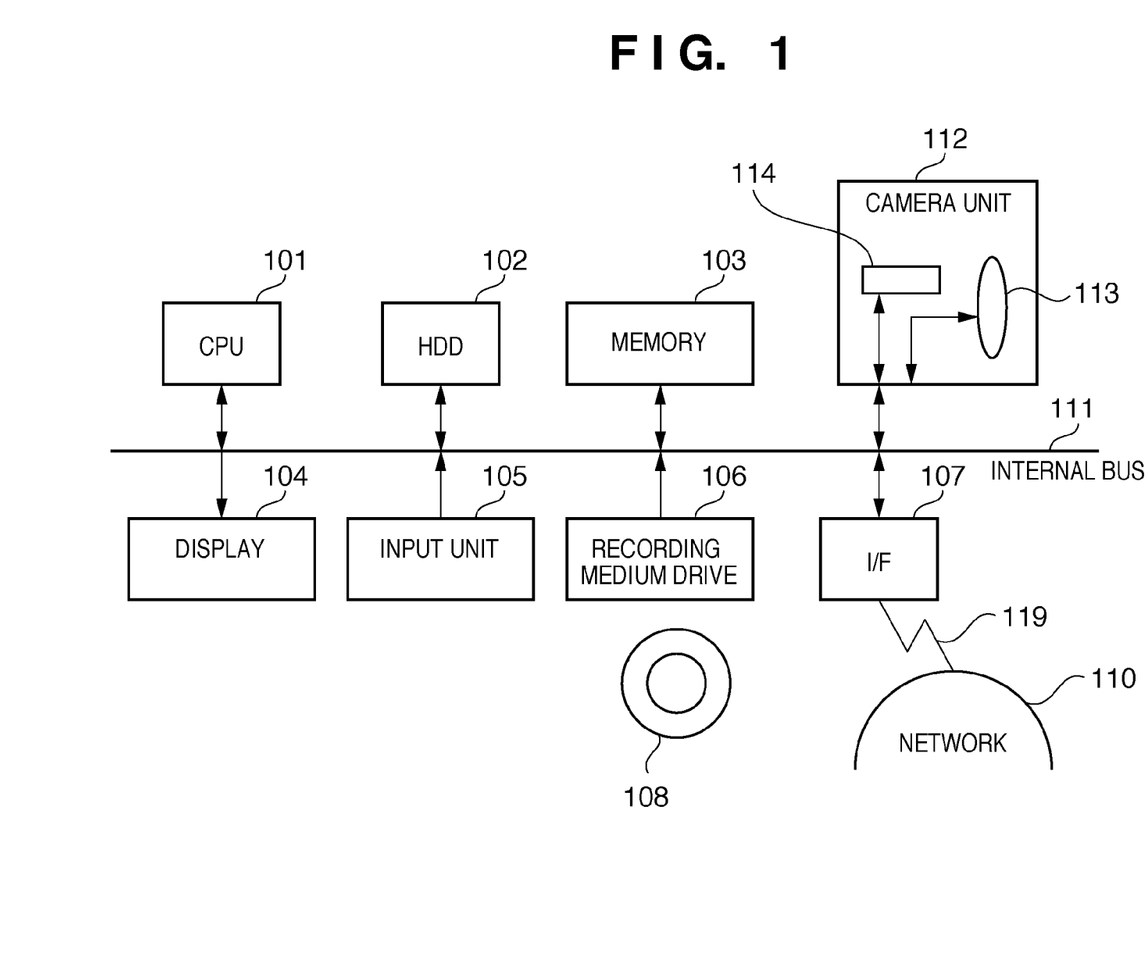
FIG. 1 is a block diagram showing the arrangement of a display control apparatus according to an embodiment of the present invention.

An embodiment in which a personal computer (PC) implements a display control apparatus according to the present invention will be explained with reference to FIG. 1. As shown in FIG. 1, a PC 100 includes a CPU 101, hard disk drive (HDD) 102, memory 103, display 104, input unit 105, recording medium drive 106, and network interface (I/F) 107 which are connected by an internal bus 111. The CPU 101 is a processor which controls the whole operation of the PC 100. The CPU 101 accepts an instruction from the user via the input unit 105 and the like, executes various programs to be described later, and performs display control of the display 104. The HDD 102 stores image data, and the operation processing sequences of the CPU 101 (for example, PC boot processing, basic input/output processing, and various programs to be described later). The memory 103 is used as a work area of the CPU 101. The display 104 is a display unit for displaying a GUI (Graphic User Interface) according to the embodiment. An image and display items to be described later are displayed on the screen of the display 104. The input unit 105 includes a keyboard and a pointing device such as a mouse for accepting instructions from the user.

The user can execute a display control program by manipulating the input unit 105. The recording medium drive 106 reads out data stored in an external recoding medium 108 including a CD-ROM, DVD-ROM, and flash memory, and writes data on the external recoding medium 108. The I/F 107 is connected to a network 110 via a communication line 109. The CPU 101 can also execute a program present on the network 110 via the I/F 107. The present invention can also be implemented by a program present on the network 110.

A camera unit 112 such as a digital video camera serving as an image capturing device is connected to the internal bus 111 of the PC 100. The camera unit 112 incorporates an image capturing unit 113 and azimuth sensor 114. In the PC 100, a direction acquisition unit provided by software arithmetic processing by the CPU 101 acquires image captured direction information of the camera unit 112 that is detected and generated by the azimuth sensor 114. Similarly, a display coordinate system transformation unit provided by software arithmetic processing by the CPU 101 transforms the display coordinate system based on the acquired image captured direction information. Further, a display control unit provided by software arithmetic processing by the CPU 101 controls to display an image captured by the image capturing unit 113 in the transformed display coordinate system. The display 104 uses the display control unit to display an image.

Note that the azimuth sensor 114 detects an orientation (direction) with respect to the reference direction by acceleration measurement, geomagnetism measurement, gyro measurement, or the like. In general, the azimuth sensor 114 outputs an orientation (direction) when the direction of gravity is defined as a reference. The orientation (direction) is given by three types of values Roll, Pitch, and Yaw. Pitch is a rotation angle about the vector of gravity. Roll is a rotation angle about the vector of the baseline (for example, vector directed to the true north) on the horizontal plane. Yaw is a rotation angle about a vector (for example, vector directed to the due east) perpendicular to the vector of the baseline on the horizontal plane.

[First Embodiment]

A case in which the display coordinate system is transformed in accordance with an image captured direction detected by an azimuth sensor 114 and an image captured by a camera unit 112 is displayed on a display 104 will be explained with reference to FIGS. 2 to 4. In the first embodiment, the ratio of the lengths of opposing sides is converted in the display coordinate system.

Figure 2:
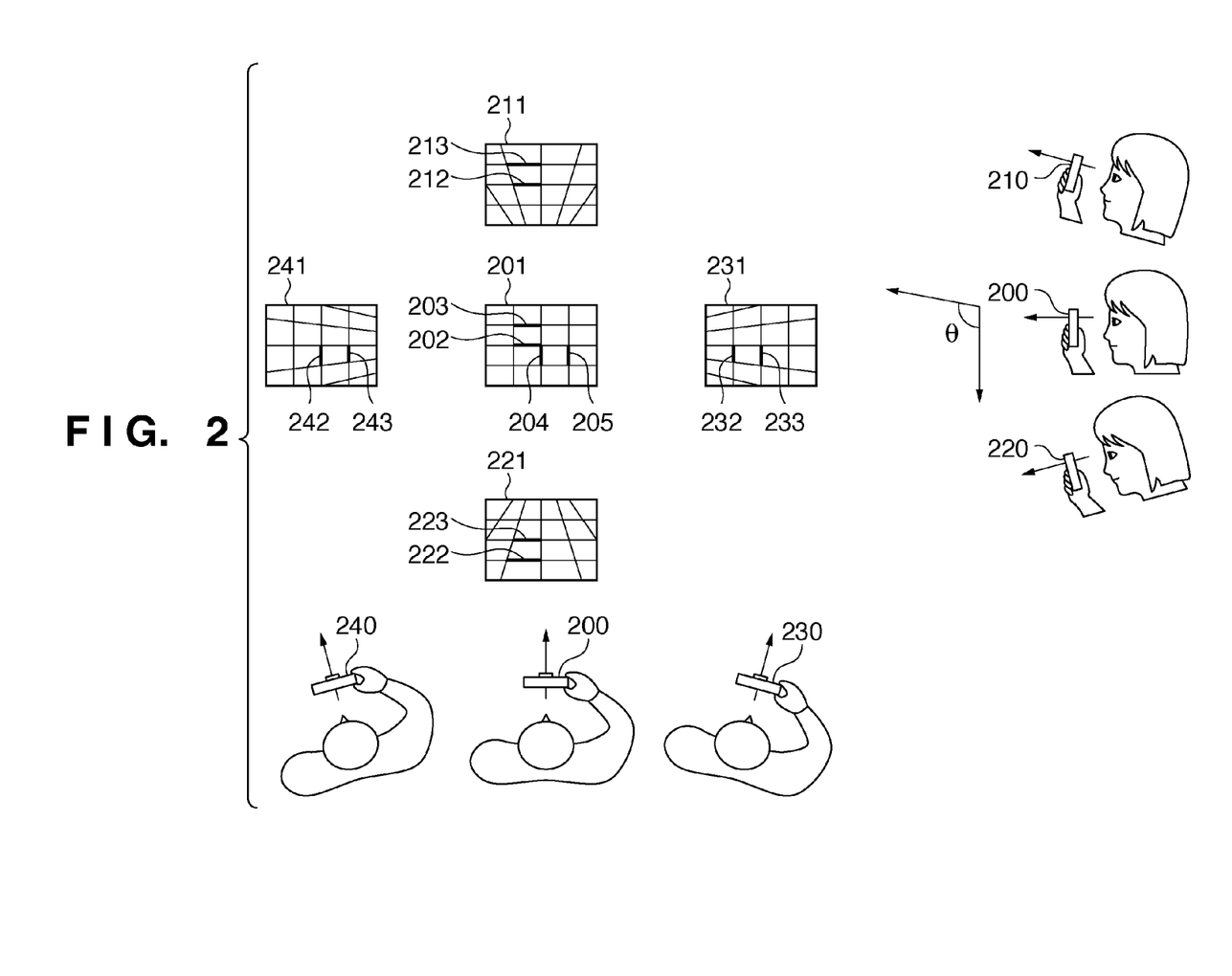
FIG. 2 is a view for explaining a display coordinate system transforming method according to the first embodiment.

FIG. 2 exemplifies a transformed display coordinate system when a direction (horizontal direction) which forms 90° with respect to the direction of gravity is defined as a reference direction (arrow 200), and there are an upward image captured direction (arrow 210), downward image captured direction (arrow 220), rightward image captured direction (arrow 230), and leftward image captured direction (arrow 240) with respect to the reference direction. A display coordinate system 201 is an example when the image captured direction matches the reference direction (arrow 200). For example, when the image captured direction changes to upward with respect to the reference direction 200, the display coordinate system 201 is transformed into a display coordinate system 211. In this case, sides 202 and 203 are opposing sides. The display coordinate system 201 is transformed into the display coordinate system 211 by converting the ratio of the lengths of the sides 202 and 203 into that of the lengths of sides 212 and 213. By transforming the display coordinate system so that the side 213 becomes longer than the side 212, the user can intuitively grasp that the image was captured while the image captured direction was upward with respect to the reference direction 200.

When the image captured direction changes to downward with respect to the reference direction 200, the display coordinate system is transformed into a display coordinate system 221. The display coordinate system 201 is transformed into the display coordinate system 221 by converting the ratio of the lengths of the sides 202 and 203 into that of the lengths of sides 222 and 223. By transforming the display coordinate system so that the side 222 becomes longer than the side 223, the user can intuitively grasp that the image was captured while the image captured direction was downward with respect to the reference direction.

Further, when the image captured direction changes to rightward with respect to the reference direction, the display coordinate system is transformed into a display coordinate system 231. In this case, sides 204 and 205 are opposing sides. The display coordinate system 201 is transformed into the display coordinate system 231 by converting the ratio of the lengths of the sides 204 and 205 into that of the lengths of sides 232 and 233. By transforming the display coordinate system so that the side 233 becomes longer than the side 232, the user can intuitively grasp that the image was captured while the image captured direction was rightward with respect to the reference direction.

When the image captured direction changes to leftward with respect to the reference direction, the display coordinate system is transformed into a display coordinate system 241. The display coordinate system 201 is transformed into the display coordinate system 241 by converting the ratio of the lengths of the sides 204 and 205 into that of the lengths of sides 242 and 243. By transforming the display coordinate system so that the side 242 becomes longer than the side 243, the user can intuitively grasp that the image was captured while the image captured direction was leftward with respect to the reference direction.

The image captured direction can be expressed in more detail by continuously changing the ratio of the lengths of opposing sides in accordance with the angle defined by the reference direction and image captured direction. Assume that the image captured direction changes to upward or downward with respect to the reference direction 200. In this case, letting $\theta$ be the image captured direction with respect to the direction of gravity, as shown in FIG. 2, the ratio of the length of the side 203 to that of the side 202 is given by $k \cdot \tan(\theta/2)$ where k is a constant. $\theta$ is a so-called angle of elevation, that is, the roll or yaw component with respect to the vector of gravity. $\theta=0°$ when the image captured direction matches the direction of gravity, and $\theta=90°$ when it matches the horizontal direction. In the embodiment, the following table shows the ratio (ratio of sides/k) of the length of the side 203 to that of the side 202 for the constant k=1 at $\theta=0°$ (image captured direction coincident with the direction of gravity) to $\theta=180°$ (image captured direction coincident with a direction opposite to the direction of gravity).

TABLE 1

| $\theta$ | 0° | 45° | 90° | 135° | 180° |
|---|---|---|---|---|---|
| (Ratio of Sides)/k | 0 | 0.414214 | 1 | 2.414214 | ∞ |

The table reveals that the ratio of the sides increases as the angle defined by the reference direction and image captured direction increases from the reference direction (θ=90° in this case) to 135° and 180°. Since the side 203 becomes longer than the side 202, the user can grasp that the image was captured while the image captured direction was upward with respect to the reference direction. From the length of the side 203, he can estimate the degree by which the image captured direction changed upward. In contrast, the ratio of the sides decreases as the angle defined by the reference direction and image captured direction decreases from the reference direction to 45° and 0°. Since the side 202 becomes longer than the side 203, the user can grasp that the image was captured while the image captured direction was downward with respect to the reference direction. From the ratio of the lengths of the sides 202 and 203, he can estimate the degree by which the image captured direction changed downward.

Note that the equation and table above are merely an explanation of one embodiment of the present invention, and the present invention is not limited to them.

<Display Example of Image>

An example of transforming an image captured by the camera unit 112 serving as a digital camera in conformity with a shape (rectangle or quadrangle) upon changing the ratio of the lengths of opposing sides in the display coordinate system in accordance with the image captured direction, and displaying the transformed image on the display 104 will be explained with reference to FIG. 3.

Figure 3:
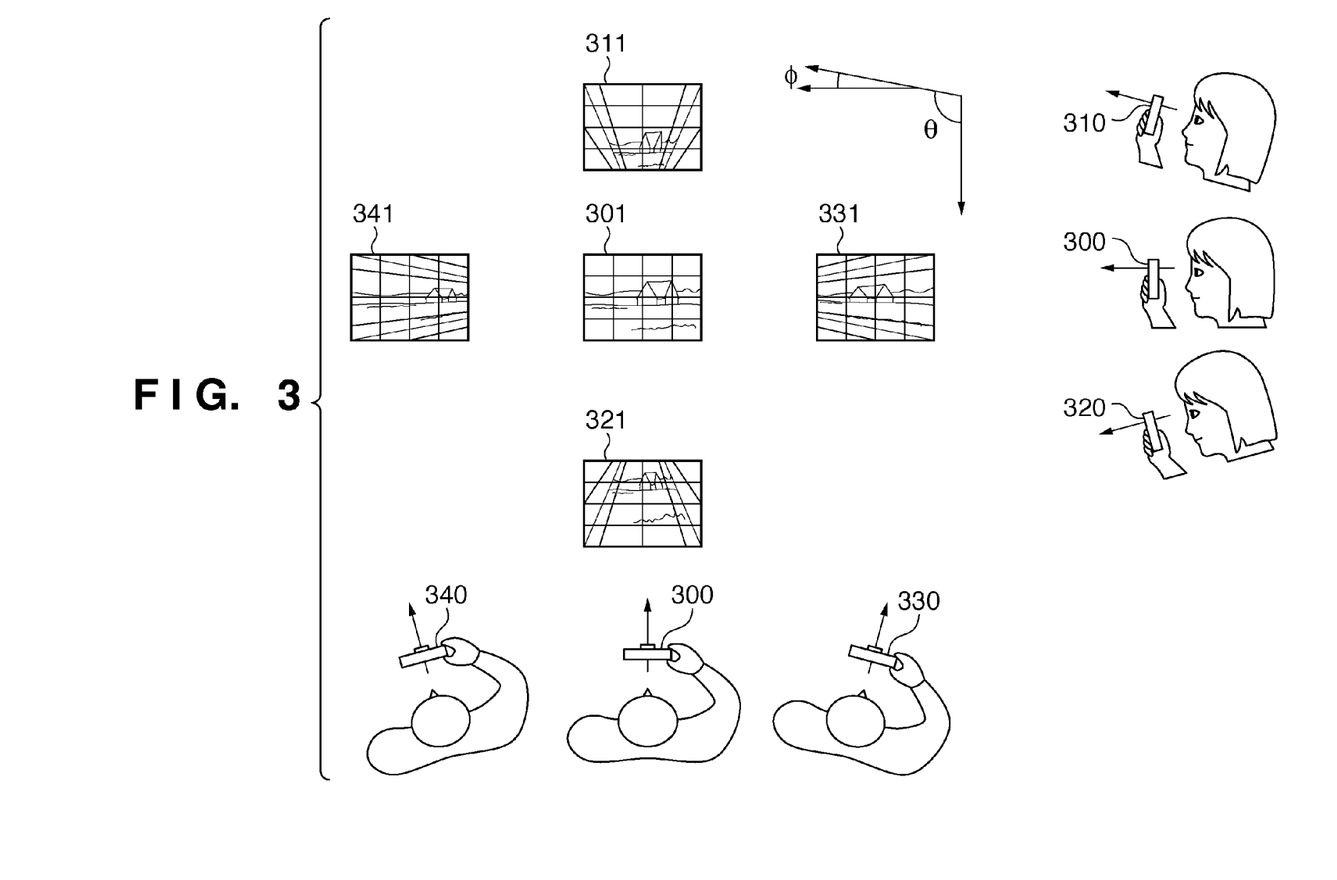
FIG. 3 is a view exemplifying an image displayed on a transformed display coordinate system.

In the example of FIG. 3, a direction (horizontal direction) which forms 90° with respect to the direction of gravity is defined as a reference direction (arrow 300). There are an upward image captured direction (arrow 310), downward image captured direction (arrow 320), rightward image captured direction (arrow 330), and leftward image captured direction (arrow 340) with respect to the reference direction. In this case, an image is displayed on a display coordinate system transformed in conformity with a shape (rectangle or quadrangle) upon changing the ratio of the lengths of opposing sides in the display coordinate system.

In FIG. 3, an image 301 is displayed on the display 104 when the image captured direction matches the reference direction (horizontal direction). For example, when the image captured direction changes upward with respect to the reference direction (horizontal direction), the displayed image is transformed into an image 311. That is, when the image captured direction with respect to the reference direction (horizontal direction) is $\phi°$, the ratio of horizontally opposing sides in the display coordinate system changes to be $k \cdot \tan((\phi+90)/2)$ where k is a constant. The reference direction (horizontal direction) forms a right angle (90°) with respect to the direction of gravity. Thus, $\theta=\phi+90$ when $\theta°$ is an angle of elevation with respect to the direction of gravity. The image 311 has an upper side longer than the lower one. The user can intuitively grasp that the image was captured while the image captured direction was upward with respect to the reference direction. Since the ratio of the lengths of opposing sides continuously changes depending on the angle, the image captured direction can be expressed in more detail.

When the image captured direction is rightward (arrow 330) with respect to the reference direction 300, the displayed image is transformed into an image 331. That is, when the clockwise rotation angle about the direction of gravity is $\rho°$, the ratio of vertically opposing sides in the display coordinate system changes to be $k \cdot \tan((\rho+90)/2)$. The image 331 has a right side longer than the left one. The user can intuitively grasp that the image was captured while the image captured direction was rightward with respect to the reference direction.

Similarly, images 321 and 341 are displayed when the image captured direction is downward and leftward with respect to the reference direction 300. From the ratio of opposing sides, the user can intuitively grasp an image captured direction in which the image was captured.

<Image Display Processing>

Processing until a transformed image is restored to a state before transformation a predetermined time after the image is transformed in accordance with the deviation of the image captured direction when the image captured direction deviates from the reference direction will be explained with reference to FIG. 4. A CPU 101 performs each processing of the flowchart shown in FIG. 4 by expanding, in a memory 103, a program stored in an HDD 102 or the like and executing it. In the following description, an image captured by an image capturing unit 113 is displayed in real time. That is, the image is updated at a predetermined frame rate and displayed as a moving image regardless of the timing to transform the shape of an image to be displayed.

Figure 4:
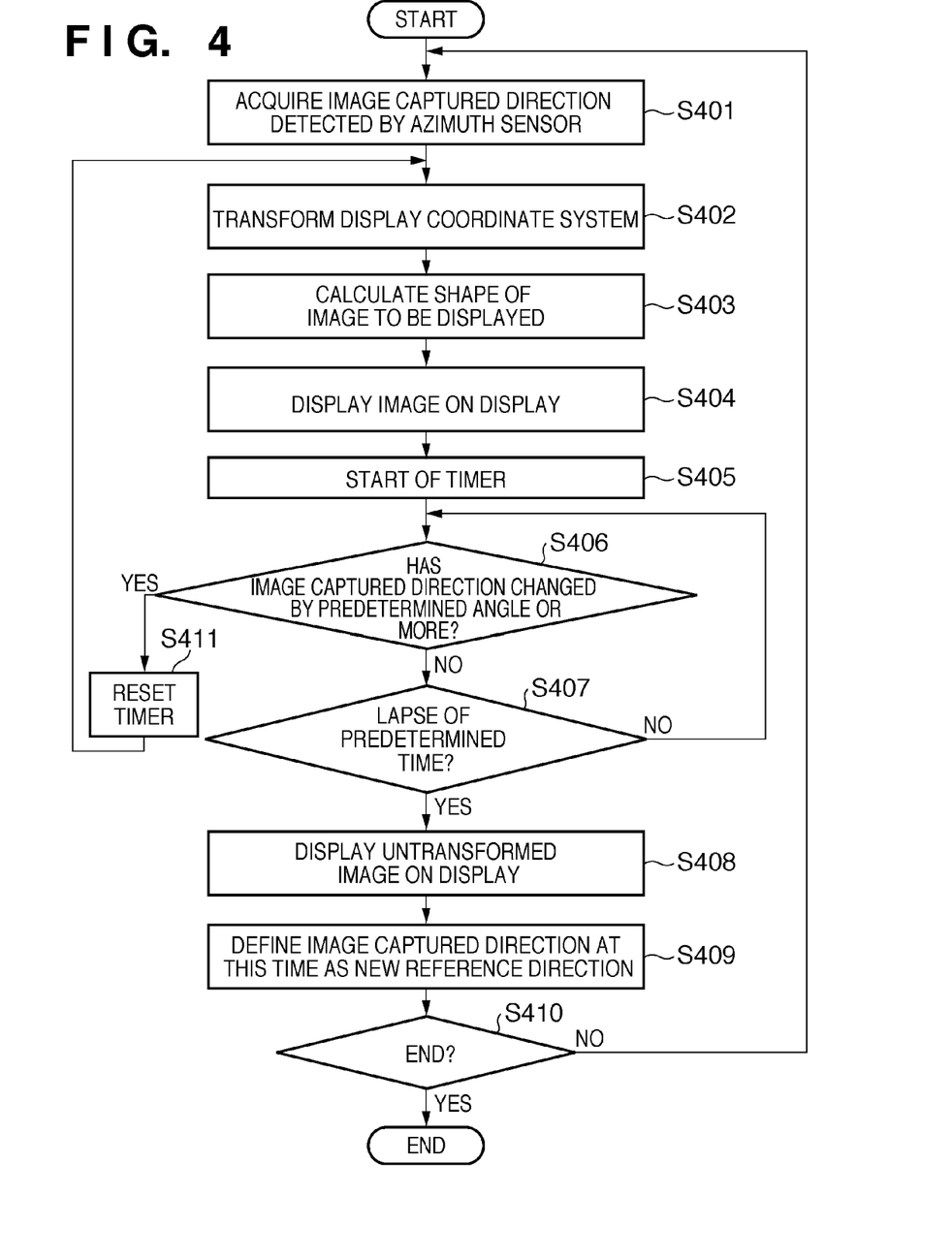
FIG. 4 is a flowchart showing image display processing according to the embodiment.

In step S401 of FIG. 4, the CPU 101 acquires image captured direction information with respect to the reference direction that is detected by the azimuth sensor 114. In step S402, the CPU 101 transforms the display coordinate system by converting the ratio of the lengths of opposing sides in the display coordinate system in accordance with the image captured direction information acquired in step S401, as described with reference to FIG. 2.

In step S403, the CPU 101 calculates the shape of an image to be displayed in the display coordinate system transformed in step S402. In step S404, the CPU 101 acquires captured image data from the image capturing unit 113. As described with reference to FIG. 3, the CPU 101 transforms the captured image data into the shape calculated in step S403, and displays the transformed image on the display 104. Accordingly, the image transformed as shown in FIG. 3 in accordance with the image captured direction is displayed. In step S405, the CPU 101 starts counting time by a timer (not shown).

In step S406, the CPU 101 acquires the image captured direction information with respect to the reference direction that is detected by the azimuth sensor 114. The CPU 101 then determines whether the image captured direction has changed by a predetermined angle or more. If the image captured direction has changed by the predetermined angle or more, the CPU 101 stops counting time by the timer in step S411, and the process returns to step S402. If the image captured direction has not changed by the predetermined angle or more, the process advances to step S407 to repeat the determination in step S406 until the time counted by the timer which has started in step S405 reaches a predetermined time.

If the time counted by the timer reaches the predetermined time, the process advances to step S408, and the CPU 101 restores the image transformed in step S404 to the original untransformed image (the shape of the image captured by the image capturing unit 113), and displays the original untransformed image on the display 104. In step S409, the CPU 101 newly defines, as the reference direction, the image captured direction of the image displayed in step S408. The process advances to step S408 if a predetermined time has elapsed without changing the image captured direction by a predetermined angle or more after a captured image is transformed and displayed, that is, if the image captured direction is assumed to be fixed. When the image captured direction is regarded to be fixed, the processes in steps S408 and S409 are executed to perform the foregoing image display processing using the image captured direction fixed by the photographer as a new reference direction. For subsequently displayed images, the user can intuitively grasp, from the image captured direction fixed by the photographer, the direction in which the image was captured, or the motion of the photographer when he captured the image. In step S410, the CPU 101 determines whether the user has manipulated an input unit 105 to input a display processing end instruction. If the display processing is not to end, the process returns to step S401; if it is to end, the process ends.

In FIG. 4, an image captured by the image capturing unit 113 is displayed. This processing can also be executed when playing back an image which has been captured by the image capturing unit 113 and recorded on the HDD 102 or an external recoding medium 108. In this case, for example, a moving image, and image captured direction information associated as attribute information of the moving image are read out from the HDD 102 and displayed according to the processing in FIG. 4. As a result, an image similar to one in FIG. 3 can be played back.

Not only a moving image but also a still image can be displayed similarly to FIG. 3. In addition, two or more images may be processed and simultaneously displayed on one display screen.

[Second Embodiment]

Next, processing of determining, based on the image captured direction, the display position of an image transformed in accordance with the image captured direction will be described with reference to FIG. 5.

Figure 5:
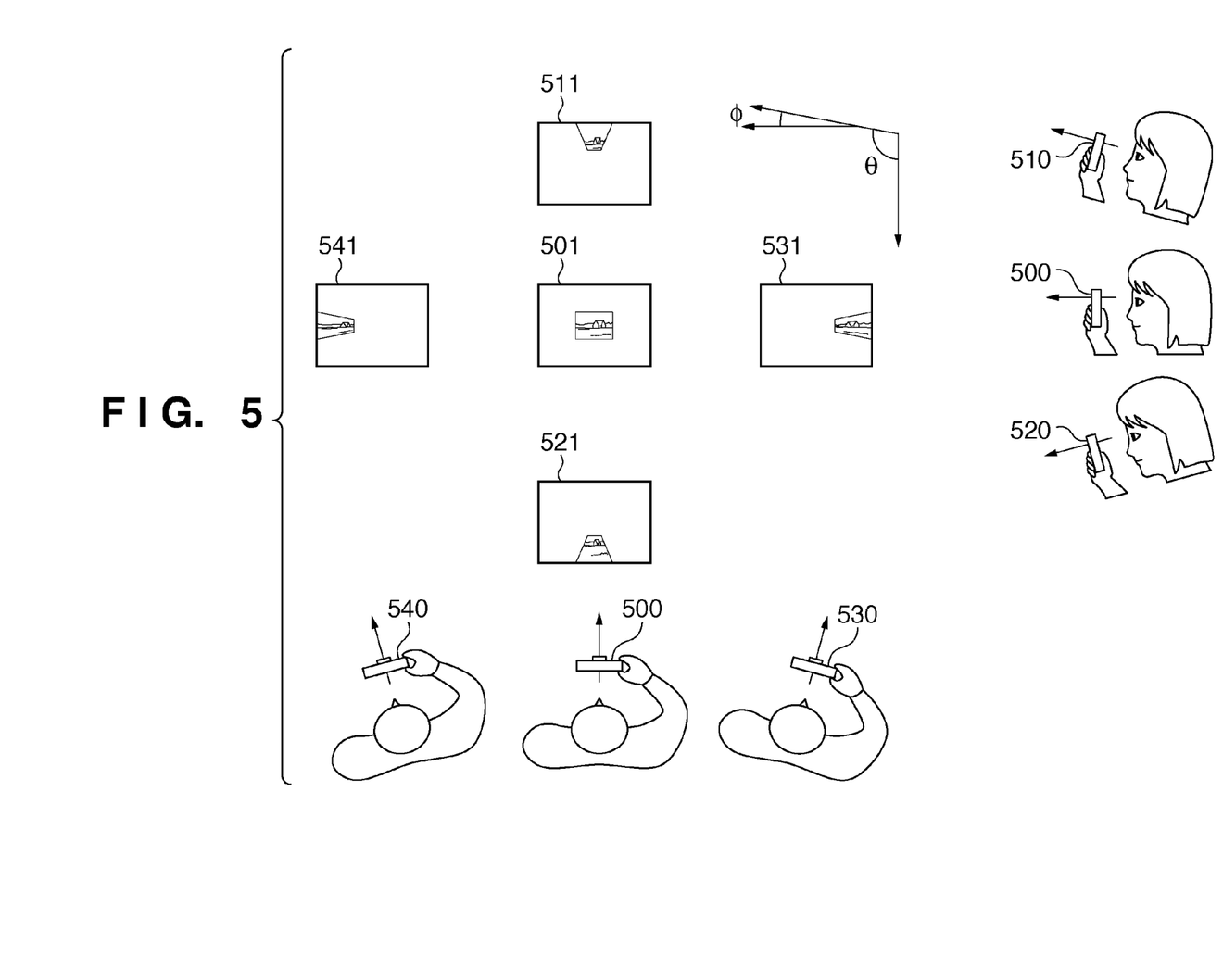
FIG. 5 is a view exemplifying an image displayed at a determined display position according to the second embodiment.

In FIG. 5, there are an upward image captured direction (arrow 510), downward image captured direction (arrow 520), rightward image captured direction (arrow 530), and leftward image captured direction (arrow 540) with respect to the reference direction (arrow 500). In this case, an image transformed in accordance with the image captured direction is displayed at a display position corresponding to the image captured direction of the image on a display 104. In FIG. 5, an image 501 is displayed on the display 104 when the image captured direction matches the reference direction 500. In the image 501, a captured image is displayed in part of the display area of the display 104, especially at the center. This indicates that the image was captured while the image captured direction matched the reference direction. When the image captured direction 510 changes to upward with respect to the reference direction 500, an image 511 is displayed. More specifically, when the image captured direction is upward by $\phi°$ with respect to the reference direction 500, the ratio of horizontally opposing sides in the display coordinate system changes to be $k \cdot \tan((\phi+90)/2)$ (k is a constant). In addition, the image display position moves by $d \cdot \sin \phi$ from the reference position 501 (d is a constant). The image 511 has an upper side longer than the lower one upon transforming the display coordinate system in accordance with the image captured direction. The user can intuitively grasp that the image was captured while the image captured direction was upward with respect to the reference direction. Since the image display position moves upward by $d \cdot \sin \phi$ from the reference position, he can also intuitively grasp that the image was captured while image captured direction was upward.

Similarly, images 521, 531, and 541 are displayed when the image captured direction is downward (arrow 520), rightward (arrow 530), and leftward (arrow 540) with respect to the reference direction 500. In each image, the display coordinate system is transformed so that one of opposing sides becomes longer than the other. The user can intuitively grasp the direction in which the image was captured with respect to the reference direction. The image display area moves in a direction in which the photographer faced in capturing with respect to the reference direction. The user can also intuitively grasp the direction in which the photographer was facing while capturing the image.

<Display Position Determination Processing>

Processing of determining the display position of a captured image in the second embodiment will be explained with reference to FIG. 6. A CPU 101 performs each processing of the flowchart shown in FIG. 6 by expanding, in a memory 103, a program stored in an HDD 102 or the like and executing it. In the following description, an image captured by an image capturing unit 113 is displayed in real time, similar to FIG. 4.

Figure 6:
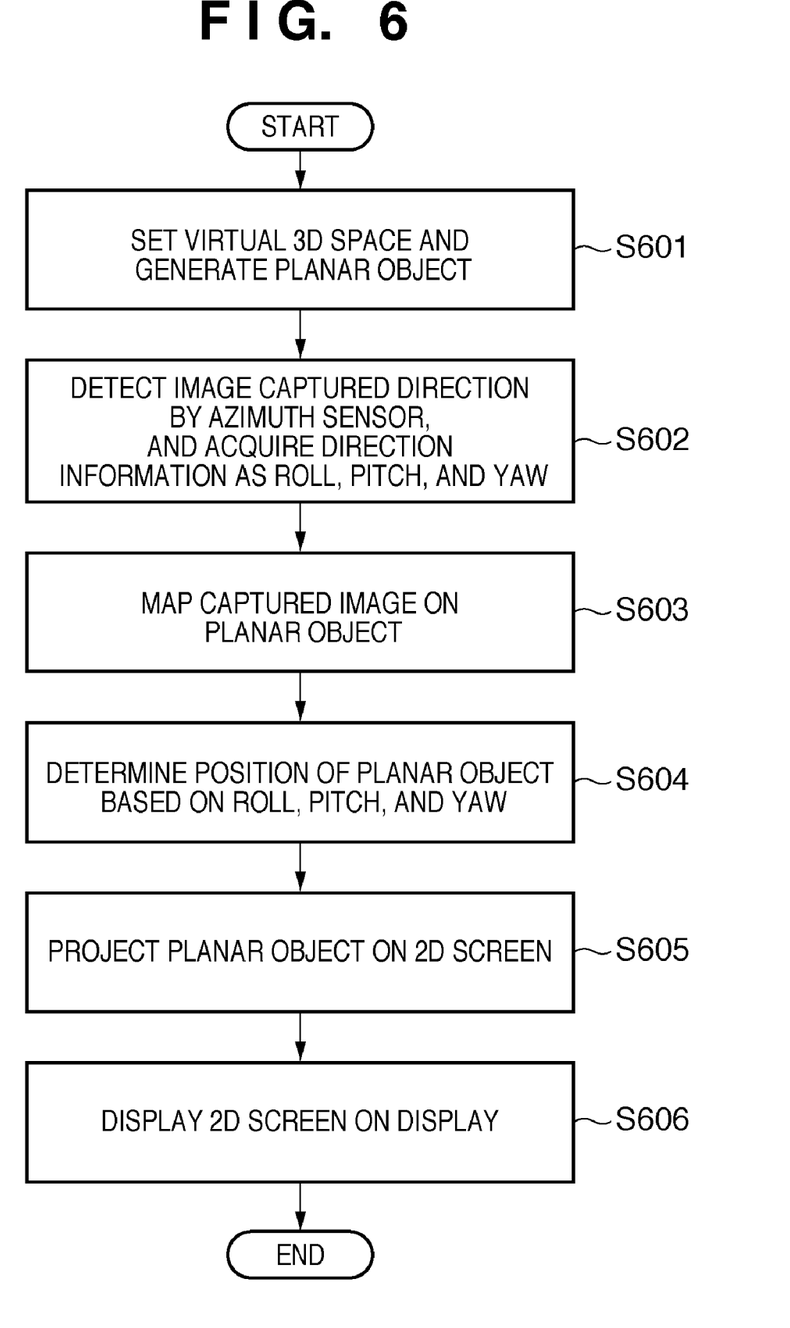
FIG. 6 is a flowchart showing display position determination processing according to the second embodiment.

In step S601 of FIG. 6, the CPU 101 sets a virtual 3D space, and generates, in the space, a virtual planar object which is geometrically similar to the region of an image captured by the image capturing unit 113 and has a predetermined size. In step S602, the CPU 101 controls an azimuth sensor 114 to detect an image captured direction with respect to the reference direction, and acquires the image captured direction as the roll, pitch, and yaw. In step S603, the CPU 101 maps the image captured by the image capturing unit 113 on the planar object. In step S604, the CPU 101 determines a position in the 3D space based on the roll, pitch, and yaw. In step S605, the CPU 101 transforms the coordinates of the planar object in the 3D space according to a predetermined method (for example, perspective projection method), and then projects the planar object on the 2D screen. In step S606, the CPU 101 displays the 2D screen on the display 104.

Subsequent to step S606, the CPU 101 may execute the processes of S406 to S409 in FIG. 4 to, when the image captured direction is fixed, define the fixed image captured direction as a new reference direction. The processing in FIG. 6 is periodically repeated to dynamically change the position and shape of an image displayed following a change of the image captured direction.

Similar to the processing in FIG. 4, the processing in FIG. 6 is also applicable to processing of playing back an image read out from the HDD 102. Even a still image can be displayed in accordance with the image captured direction, as shown in FIG. 5. Two or more images may undergo the processing in FIG. 6 to simultaneously display two images on one display screen.

Figure 7:
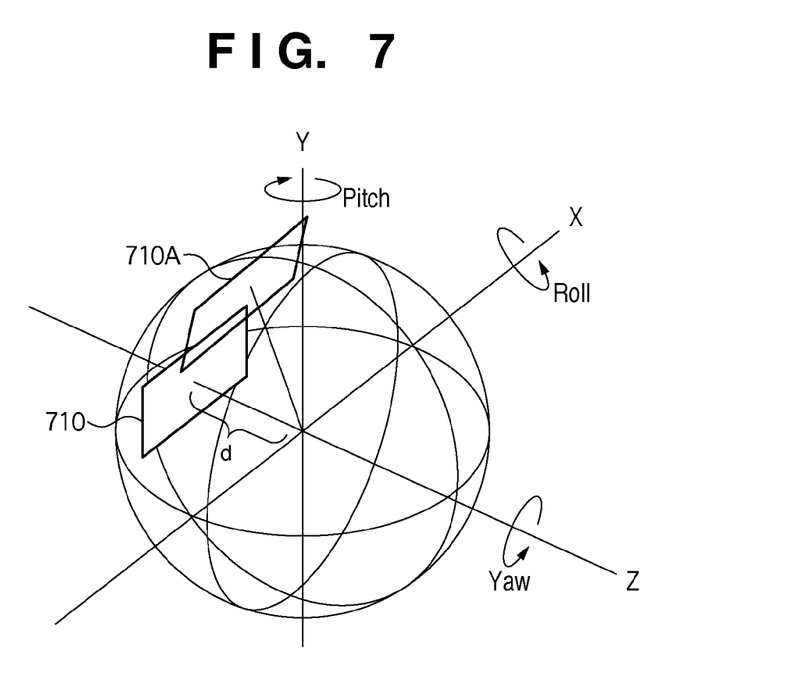
FIG. 7 is a view for explaining display position determination processing according to the second embodiment.

A method of determining the display position of an image using the planar object in FIG. 6 will be explained with reference to FIGS. 7 and 8. FIG. 7 shows a state in which a planar object 710 is generated in a virtual 3D space and the position in the 3D space is changed to a position 710A in accordance with pieces of roll, pitch, and yaw information obtained by the azimuth sensor 114. In FIG. 7, the planar object 710 is spaced apart from the origin by a predetermined distance d along the Z-axis within the x-y plane when the image captured direction matches the reference direction (roll, pitch, and yaw are 0). Roll is a rotation angle about the vector of the baseline (for example, vector directed to the true north) on the horizontal plane. In this example, roll is a rotation angle about the X-axis. Pitch is a rotation angle about the vector of gravity and is a rotation angle about the Y-axis in this example. Yaw is a rotation angle about a vector (for example, vector directed to the due east) perpendicular to the vector of the baseline on the horizontal plane and is a rotation angle about the Z-axis in this example. For example, when the image captured direction changes to upward with respect to the reference direction, the roll value increases from 0 and the planar object moves to the position 710A.

Figure 8:
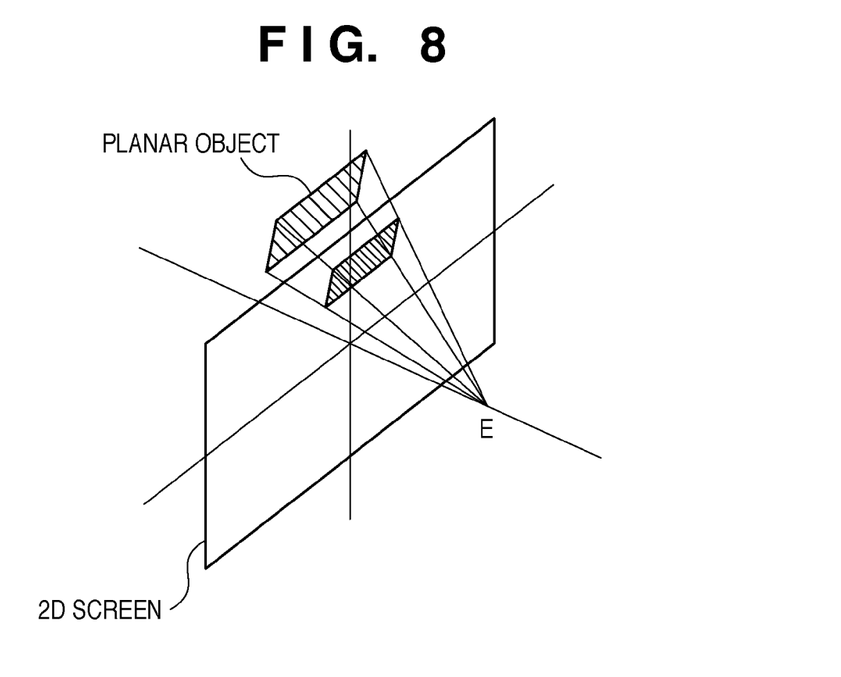
FIG. 8 is a view for explaining display position determination processing according to the second embodiment.

FIG. 8 shows a state in which the planar object in the 3D space is projected on the 2D screen by the perspective projection method. In FIG. 8, E is the viewpoint of perspective projection. The 2D screen is positioned on the X-Y plane. Projection on the 2D screen is done by extending the line of sight from the viewpoint E to the planar object and obtaining the intersection point between the line of sight and the 2D screen.

[Third Embodiment]

In the first and second embodiments, an image is displayed in accordance with the image captured direction. However, an image may be displayed based on not only the image captured direction but also viewing angle information such as the zoom value in capturing. In this case, the image size is changed in accordance with the viewing angle information, and the image is transformed in accordance with the image captured direction and displayed on a display 104. For example, in step S401 of FIG. 4, viewing angle information is acquired from the lens specifications of a camera unit 112 used in capturing, and the zoom size in capturing, together with the image captured direction. In steps S402 and S403, the display coordinate system is transformed in accordance with the image captured direction, and also the image size is calculated based on the viewing angle information. At a high zoom ratio, a distant object is assumed to be captured, so the size of an image to be displayed is decreased. To the contrary, at a low zoom ratio, a close object is assumed to be captured, and the size of an image to be displayed is increased. With this setting, the user can intuitively grasp whether the captured object was close to or apart from the photographer.

[Fourth Embodiment]

Figure 9:
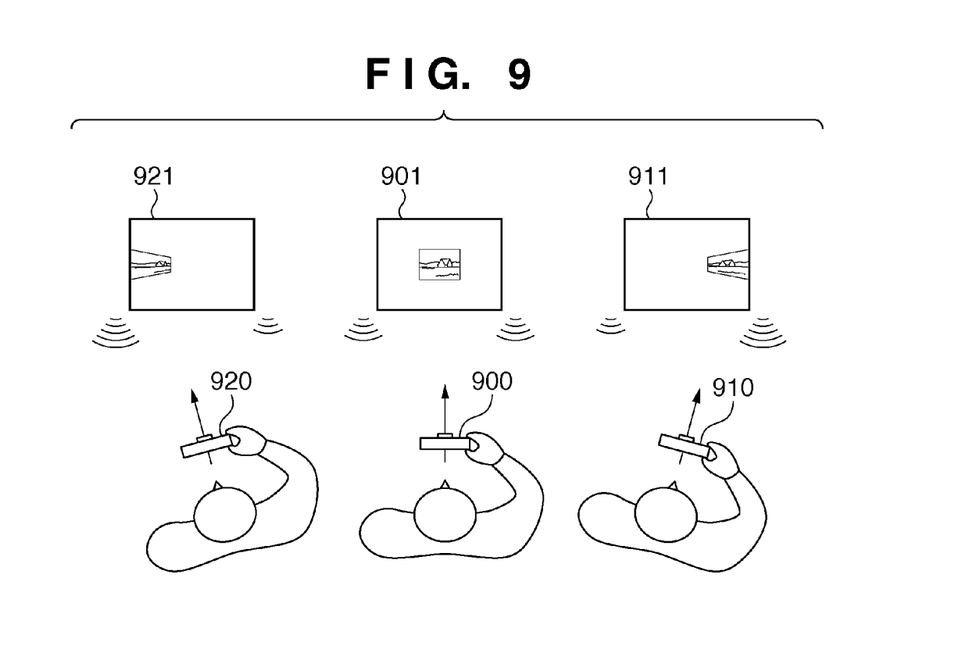
FIG. 9 is a view for explaining audio output processing according to the fourth embodiment.

An example in which a microphone is added to a camera unit 112 to acquire pieces of audio information in a plurality of directions will be described with reference to FIG. 9. In this example, an image is transformed. In addition, the ratio of distribution of sounds in the plurality of directions is converted in accordance with the image captured direction, outputting the sounds from loudspeakers. FIG. 9 shows a state in which the ratio of distribution of sounds is converted when the image captured direction is rightward (arrow 910) or leftward (arrow 920) with respect to the reference direction (arrow 900). In FIG. 9, a volume 901 is output from right and left loudspeakers when the image captured direction matches the reference direction. For example, when the image captured direction changes to rightward with respect to the reference direction, volumes output from the loudspeakers change to increase the volume output from the right loudspeaker and decrease one output from the left loudspeaker, like a volume 911. The user can feel with an excellent sense of reality the direction in which the photographer moved, from a change of the right and left volumes together with the image.

[Fifth Embodiment]

Figure 10:
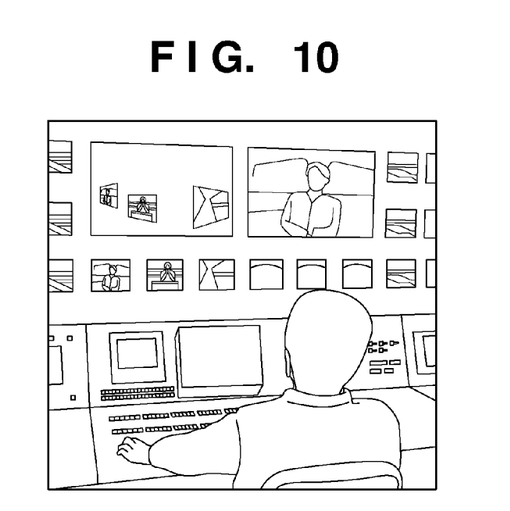
FIG. 10 is a view showing a state in which a display control method according to the embodiment is applied to display images on monitors in the control room of a studio in a broadcasting station.

An example of transforming images captured by two or more camera units 112 in accordance with respective image captured directions will be explained with reference to FIG. 10. In this example, one display 104 displays the respective images at display positions corresponding to their image captured directions. FIG. 10 shows a state in which a display control method according to the embodiment is applied to display images on monitors in the control room of a studio in a broadcasting station. In FIG. 10, three to five television cameras are generally used at the same time in the studio of the broadcasting station. Images captured by the respective cameras at different angles are selected and switched to meet the purpose of production, thereby producing program contents. By applying the display control of the present invention to this monitoring system, a user (switcher) who selects and switches images can select an image captured at an optimum angle while grasping the position of the television camera. The present invention is therefore suitable for production of broadcast program contents.

According to the above-described embodiments, a captured image can be displayed to facilitate intuitive grasp of the direction in which the displayed image was captured, or the motion of the photographer when he captured the image. In particular, a transformed image is restored to the original image a predetermined time after the image was transformed. This emphasizes the motion before and after the image was transformed in accordance with the image captured direction, and the user can more easily grasp the motion.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-134300, filed Jun. 3, 2009, which is hereby incorporated by reference herein in its entirety.

What is claimed is:

1. A display control apparatus comprising:
a display unit configured to display a captured image;
an acquisition unit configured to acquire image captured direction information indicating a direction in which the image was captured;
a conversion unit configured to convert a shape of the image in accordance with the image captured direction information; and
a control unit configured to control to display the shape-converted image on said display unit,
wherein when a predetermined time has elapsed without changing the image captured direction, said control unit displays an image of which the shape is not converted, and sets an image captured direction of the image as a reference direction.

2. The apparatus according to claim 1, wherein
said conversion unit converts the shape of the image in accordance with a coordinate system which is transformed based on the image captured direction information and is used to display an image on said display unit, and
said control unit controls to display the shape-converted image in the transformed coordinate system of said display unit.

3. The apparatus according to claim 1, wherein said conversion unit converts a ratio of lengths of opposing sides in a coordinate system in accordance with the image captured direction information.

4. The apparatus according to claim 3, wherein said conversion unit converts the shape of the captured image in accordance with a quadrangle obtained by converting the ratio of the lengths of the opposing sides in the coordinate system.

5. The apparatus according to claim 1, further comprising a determination unit configured to determine a display position of the image in a display area of said display unit in accordance with the image captured direction information.

6. The apparatus according to claim 5, wherein
said determination unit has
  a unit configured to set a virtual 3D space and generate a planar object;
  a unit configured to map the captured image on the planar object in accordance with the image captured direction information;
  a unit configured to determine a position of the planar object in accordance with the image captured direction information; and
  a unit configured to project the planar object on a 2D screen, and
said control unit displays the 2D screen on said display unit.

7. The apparatus according to claim 5, wherein said control unit displays a plurality of captured images in different image captured directions in one display area of said display unit.

8. The apparatus according to claim 1, further comprising:
  a unit configured to acquire viewing angle information when the image was captured; and
  a unit configured to convert a size of the captured image in accordance with the viewing angle information.

9. The apparatus according to claim 1, wherein the image captured direction information is detected by an image capturing device which captured the image.

10. The apparatus according to claim 9, wherein the image captured direction information includes magnitudes of movement by which the image captured direction moved along two axes perpendicular to a reference direction.

11. The apparatus according to claim 9, wherein the image captured direction information includes rotation angles about three axes perpendicular to each other.

12. The apparatus according to claim 9, wherein the captured image is one of a moving image and still image captured by the image capturing device.

13. A method of controlling a display apparatus that displays a captured image, the method comprising the steps of:
  acquiring image captured direction information indicating a direction in which the image was captured;
  converting a shape of the image in accordance with the image captured direction information; and
  controlling to display the shape-converted image on the display apparatus,
  controlling to display, when a predetermined time has elapsed without changing the image captured direction, an image of which the shape is not converted, and to set an image captured direction of the image as a reference direction.

14. A computer-readable storage medium with an executable program stored thereon, wherein the program instructs a microprocessor to perform the method according to claim 13.

15. A display control apparatus comprising:
  a display unit configured to display a captured image;
  an acquisition unit configured to acquire image captured direction information indicating a direction in which the image was captured;
  a conversion unit configured to convert a shape of the image in accordance with the image captured direction information; and
  a control unit configured to control to display the shape-converted image on said display unit;
  a unit configured to acquire audio information when the image was captured;
  a unit configured to convert a ratio of distribution of the acquired audio information in accordance with the image captured direction information; and
  a unit configured to output the audio information at the converted ratio.

16. The apparatus according to claim 15, wherein
said conversion unit converts the shape of the image in accordance with a coordinate system which is transformed based on the image captured direction information and is used to display an image on said display unit, and
said control unit controls to display the shape-converted image in the transformed coordinate system of said display unit.

17. The apparatus according to claim 15, wherein said conversion unit converts a ratio of lengths of opposing sides in a coordinate system in accordance with the image captured direction information.

18. The apparatus according to claim 15, wherein said conversion unit converts the shape of the captured image in accordance with a quadrangle obtained by converting the ratio of the lengths of the opposing sides in the coordinate system.

19. The apparatus according to claim 15, wherein
when a predetermined time has elapsed without changing the image captured direction, said control unit displays an image before converting the shape in a coordinate system before transformation, and
an image captured direction of the image is set as a reference direction.

20. The apparatus according to claim 15, further comprising:
  a unit configured to acquire audio information when the image was captured;
  a unit configured to convert a ratio of distribution of the acquired audio information in accordance with the image captured direction information; and
  a unit configured to output the audio information at the converted ratio.

21. The apparatus according to claim 15, wherein the image captured direction information is detected by an image capturing device which captured the image.

22. The apparatus according to claim 21, wherein the image captured direction information includes magnitudes of movement by which the image captured direction moved along two axes perpendicular to a reference direction.

23. The apparatus according to claim 21, wherein the image captured direction information includes rotation angles about three axes perpendicular to each other.

24. The apparatus according to claim 21, wherein the captured image is one of a moving image and still image captured by the image capturing device.

25. A method of controlling a display apparatus that displays a captured image, the method comprising the steps of:
  acquiring image captured direction information indicating a direction in which the image was captured;
  converting a shape of the image in accordance with the image captured direction information; and
  controlling to display the shape-converted image on the display apparatus;
  acquiring audio information when the image was captured;

converting a ratio of distribution of the acquired audio information in accordance with the image captured direction information; and outputting the audio information at the converted ratio.

26. A non-transitory computer-readable storage medium with an executable program stored thereon, wherein the program instructs a microprocessor to perform the method according to claim 25.

* * * * *